(12) United States Patent
Miller

(10) Patent No.: US 9,337,724 B2
(45) Date of Patent: May 10, 2016

(54) LOAD SENSING VOLTAGE CHARGE PUMP SYSTEM

(71) Applicant: GLOBALFOUNDRIES INC., Grand Cayman (KY)

(72) Inventor: Christopher P. Miller, Underhill, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 136 days.

(21) Appl. No.: 14/083,781

(22) Filed: Nov. 19, 2013

(65) Prior Publication Data

US 2015/0137773 A1 May 21, 2015

(51) Int. Cl.
*H02M 3/07* (2006.01)
*H02M 1/00* (2006.01)

(52) U.S. Cl.
CPC ...... *H02M 3/073* (2013.01); *H02M 2001/0032* (2013.01); *H02M 2003/077* (2013.01); *Y02B 70/16* (2013.01)

(58) Field of Classification Search
CPC . H02M 3/07; H02M 3/073; H02M 2003/075; H02M 2003/077
See application file for complete search history.

(56) References Cited

U.S. PATENT DOCUMENTS

| | | | |
|---|---|---|---|
| 4,638,464 A | 1/1987 | Cranford, Jr. et al. | |
| 4,752,699 A | 6/1988 | Cranford, Jr. et al. | |
| 5,969,565 A * | 10/1999 | Naganawa | 327/536 |
| 5,999,475 A * | 12/1999 | Futatsuya | G11C 16/12 365/185.23 |
| 6,154,411 A * | 11/2000 | Morishita | 365/226 |
| 6,285,622 B1 * | 9/2001 | Haraguchi et al. | 365/226 |
| 6,414,881 B1 * | 7/2002 | Fujii | G11C 5/145 327/534 |
| 6,597,235 B2 * | 7/2003 | Choi | 327/536 |
| 6,809,573 B2 | 10/2004 | Kim | |
| 7,091,769 B2 * | 8/2006 | Kwon | H02M 3/073 327/535 |
| 7,135,900 B2 | 11/2006 | Sohn | |
| 7,274,248 B2 * | 9/2007 | Okamoto | G11C 5/145 327/536 |
| 7,443,230 B2 * | 10/2008 | Chen | H02M 3/07 327/535 |
| 7,501,881 B2 * | 3/2009 | Youn et al. | 327/536 |
| 7,564,717 B2 | 7/2009 | Sato et al. | |
| 7,733,162 B2 * | 6/2010 | Kim et al. | 327/536 |
| 8,013,666 B1 | 9/2011 | Liu | |
| 8,035,440 B2 * | 10/2011 | Hernandez-Garduno et al. | 327/536 |
| 8,339,187 B2 | 12/2012 | Tran et al. | |

(Continued)

OTHER PUBLICATIONS

Lee, et al., "A Regulated Charge Pump With Small Ripple Voltage and Fast Start-Up," IEEE Journal of Solid-State Circuits, vol. 41, No. 2, Feb. 2006, pp. 425-432.

*Primary Examiner* — Thomas J Hiltunen
(74) *Attorney, Agent, or Firm* — Gibb & Riley, LLC; David A. Cain, Esq.

(57) ABSTRACT

A load-sensing voltage charge pump system may include a plurality of reference voltage inputs including a target voltage input. The system may also include a plurality of voltage charge pump segments equal in number to the plurality of reference voltage inputs. A voltage charge pump segment may include: a regulator that receives a reference voltage, and a voltage charge pump that outputs a current to a load at a sensed voltage. The regulator may enable each of the voltage charge pump segments, when the sensed voltage is less than or equal to the one of the reference voltages and the target voltage. The system may include a boosted line connected in parallel to an output of each of the voltage charge pump segments. The boosted line may receive the current at the sensed voltage from each of the voltage charge pump segments that is enabled.

12 Claims, 4 Drawing Sheets

(56) References Cited

U.S. PATENT DOCUMENTS

| | | |
|---|---|---|
| 8,339,206 B2 | 12/2012 | Sawada |
| 8,400,838 B2 * | 3/2013 | Kumazaki ............. G11C 16/30 365/185.17 |
| 9,019,003 B2 * | 4/2015 | Kim ............................ 327/536 |
| 2007/0096796 A1 * | 5/2007 | Firmansyah et al. ......... 327/536 |
| 2010/0085110 A1 * | 4/2010 | Jiao et al. ..................... 327/536 |
| 2013/0093490 A1 * | 4/2013 | Kim et al. ..................... 327/306 |

* cited by examiner

400

LOAD SENSING VOLTAGE CHARGE PUMP SYSTEM

BACKGROUND

1. Field of the Invention

The present disclosure relates to load sensing of a voltage charge pump system.

2. Description of Related Art

Phase change memory (PCM) is a non-volatile semiconductor memory technology that exploits the reversible switching of certain chalcogenide materials between stable states having very different resistivities. A one-bit PCM cell may be characterized by two stable states: a reset state "1", corresponding to a fully amorphous state having a high resistance, and a set state "0", corresponding to a fully (poly-) crystalline state having a low resistance. More recently, a two-bit PCM cell has been developed with four distinct intermediary states of the chalcogenide material, corresponding to different degrees of partial crystallization that yield two distinct intermediary values of resistance between that of the high resistance of the fully amorphous state and that of the low resistance of the fully (poly-) cyrstalline state.

A PCM array requires a number of DC voltages to be generated on a CMOS semiconductor device, including standard CMOS logic (~1V), bitline pre-charge (~0.4V), and wordline, read sense and write to bitline (~2.5 to 4V). Typically, voltages higher than that of the external power supply of the CMOS semiconductor device, ~1V, are generated on chip by voltage charge pump circuits. In particular, voltage tolerances are critical for resistance sensing during read operations of PCM cells and for bitline write operations. The amount of current that must be supplied for any of the DC voltages varies greatly as a function of the operating mode and the state of each of the PCM cells in the PCM array.

FIG. 1 illustrates a conventional N-stage voltage charge pump 100 including a supply voltage $V_{DD}$; N voltage charge pump stages 110, 120, 130, 140, each including a switch S, a pumping capacitor C and a clock $V_{CLK}$, typically cycling between ground and $V_{DD}$; and an output stage 150, which includes an output load represented by a current generator $I_L$ 156 and a load capacitor $C_L$ 153. During the initial clock phase, the odd switches, e.g., $S_1$ and $S_3$, are closed and the even switches, e.g., S2, are open, connecting the top plate of C in, for example, the first stage 110 to $V_{DD}$, while the bottom plate of C is connected to the ground. In the next clock phase, the switches change states, i.e., switches $S_1$ and $S_3$ are open and $S_2$ is closed. The clock in the first stage now equals $V_{DD}$ and part of the charge stored on C in the first phase is transferred to C in the second stage through closed switch $S_2$, where the bottom plate of C in the second stage is now connected to the clock equaling ground. Over both clock phases, each pumping capacitor C receives an amount of charge from the pumping capacitor to its left and transfers a part of this charge to the pumping capacitor on its right.

Typically, a regulator controls a voltage charge pump, such that the voltage charge pump is turned off when the voltage supplied to the load exceeds a target voltage. Similarly, the voltage charge pump is turned on when the regulator detects that the voltage supplied to the load has fallen beneath the target voltage. In this way, the regulator enables the voltage charge pump to supply current to the load at a voltage that is equal to or approximately equal to the target voltage.

However, over time, a sensed voltage of the load of a voltage charge pump will continuously rise above and fall below the target voltage, because current is supplied to the load from the last pumping capacitor only during the clock phase when the switch $S_{OUT}$ is closed and is drained by the load current, $I_L$, when $S_{OUT}$ is open. Thus, current is supplied to the load from the voltage charge pump as discrete pulses of charge into the load. The load, which typically includes a load capacitance and a load current that varies with time, rises in voltage due to the contribution of charge to the load capacitance from the voltage charge pump and then falls at some rate determined by the load current. As a result, the sensed voltage of the load continuously rises above and falls below the target voltage, even if the load current is assumed to be a constant. This rise and fall of the sensed voltage is called ripple, where the amplitude of the ripple about the target voltage is determined by the amount of charge supplied by each pulse of the voltage charge pump, the load capacitance, and the load current.

Load current is a significant design factor in determining the amount of charge that is supplied by the voltage charge pump with each pulse. The design of a conventional voltage charge pump system that supplies a large current load with some ripple, will have a larger amount of ripple when supplying a smaller current load, that is, the amount of voltage ripple is inversely related to the amount of current load. Thus, the problem is to design a voltage charge pump system that produces no greater ripple when supplying a smaller current load, than when supplying a large current load.

Referring to FIG. 2, as illustrated by the voltage versus time graph 200 of a conventional voltage charge pump that produces a fixed amount of current with each pulse of the voltage charge pump to a fixed load capacitance, a small load current is typically associated with a relatively large amplitude of voltage ripple and overshoot at a relatively high time-averaged voltage across the fixed load capacitance 220, while a large load current is typically associated with a relatively small amplitude of voltage ripple and overshoot at a relatively low time-averaged voltage across the fixed load capacitance 240.

In addition, conventional voltage charge pumps, using integrated circuits, cannot easily mitigate the problem of voltage ripple with large load currents with a large decoupling capacitor, because the integrated circuit technology limits the value of the decoupling capacitor due to the large area and high voltage levels required. Large capacitors may impact die size, efficiency and performance of the integrated circuits, while large 3-dimensional capacitors may not be available for non-volatile memory technologies. Power supply transition requirements may also constrain a large decoupling capacitance, and potentially long write cycles may further increase the required size of a decoupling capacitance.

There remains a need for a voltage charge pump scheme that provides improved voltage regulation across a load with small voltage ripple and overshoot to varying load currents without a large decoupling capacitance.

SUMMARY

In view of the foregoing, the disclosure may provide a load-sensing voltage charge pump system. The system may include a plurality of reference voltage inputs including a target voltage input, where each of the plurality of reference voltage inputs other than the target voltage input is offset from the target voltage input. The system may also include a plurality of voltage charge pump segments equal in number to the plurality of reference voltage inputs. Each of the plurality of voltage charge pump segments may include: a regulator that receives one of the plurality of reference voltage inputs, and a voltage charge pump that outputs a current to a load at a sensed voltage and feeds back the sensed voltage to the regulator. The regulator may enable each of the voltage charge pump segments, when the sensed voltage is less than or equal to the one of the plurality of reference voltage inputs and the target voltage input. Finally, the system may include a boosted line connected in parallel to an output of each of the plurality of voltage charge pump segments and to the load. The boosted line may receive the current at the sensed voltage from each of the voltage charge pump segments that is enabled.

The disclosure may also provide another load-sensing voltage charge pump system. This system may include a plurality of reference voltage inputs, including a target voltage input. Each of the plurality of reference voltage inputs, other than the target voltage input, may be offset from the target voltage input. The system may also include a plurality of voltage charge pump segments equal in number to the plurality of reference voltage inputs. Each of the plurality of voltage charge pump segments may include: a comparator that compares a sensed voltage from an output of each of the plurality of voltage charge segments to one of the plurality of reference voltage inputs. The comparator may be connected to at least a first oscillator and a second oscillator. The first oscillator may be connected to a first voltage charge pump that outputs a first current to a load at the sensed voltage and feeds back the sensed voltage to the comparator, and the second oscillator may be connected to a second voltage charge pump that outputs a second current to the load at the sensed voltage and feeds back the sensed voltage to the comparator. The comparator may enable the first oscillator and the second oscillator, and the first voltage charge pump and the second voltage charge pump, when the sensed voltage is less than or equal to the one of the plurality of reference voltage inputs and the target voltage input. The system may further include a boosted line connected in parallel to the output of each of the plurality of voltage charge pump segments and to the load. The boosted line may receive currents at the sensed voltage from each of the voltage charge pump segments that is enabled.

The disclosure may provide a method of providing a current to a load in a load-sensing voltage charge pump system. The method may include receiving a first reference voltage of a plurality of reference voltages by a first regulator of a first voltage charge pump segment of the load-sensing voltage charge pump system. The plurality of reference voltages may include a target voltage and each of the plurality of reference voltages, other than the target voltage, may be offset from the target voltage. The method may also include enabling, by the first regulator, a first voltage charge pump and a second voltage charge pump of the first voltage charge pump segment to output a first current to a first load on a boosted line at a first sensed voltage, when the first sensed voltage fed back to the first regulator is less than or equal to the first voltage reference and the target voltage. The method may further include receiving a second reference voltage of the plurality of reference voltages by a second regulator of a second voltage charge pump segment of the load-sensing voltage charge pump system. Finally, the method may include enabling, by the second regulator, a third voltage charge pump and a fourth voltage charge pump of the second voltage charge pump segment to output, in parallel to the first current, a second current to a second load on the boosted line at a second sensed voltage, when the second sensed voltage fed back to the second regulator is less than or equal to the second voltage reference and the target voltage.

BRIEF DESCRIPTION OF THE DRAWINGS

The structures and methods of making structures herein will be better understood from the following detailed description with reference to the drawings, which are not necessarily drawn to scale and in which.

DETAILED DESCRIPTION

Figure 1:
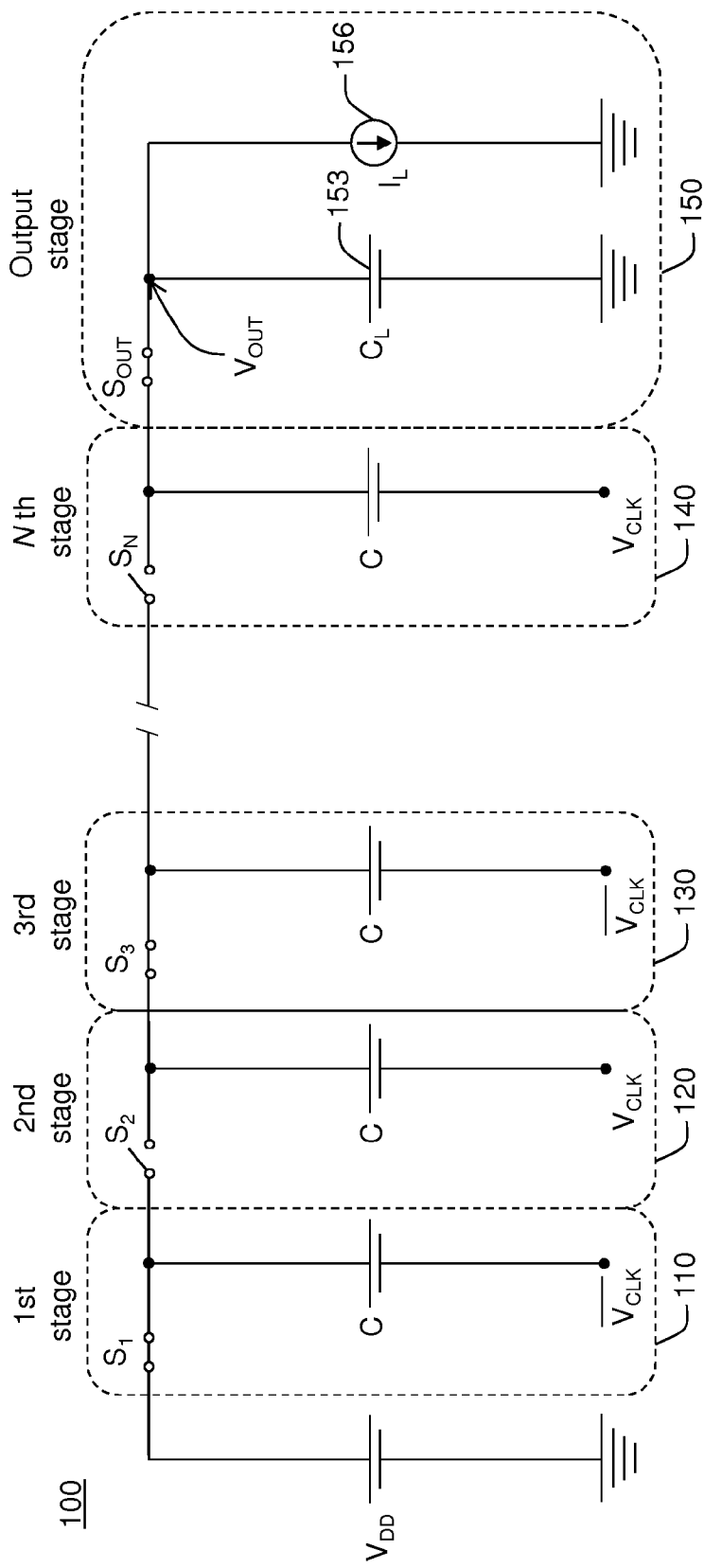
FIG. 1 is a schematic diagram illustrating a convention voltage charge pump in the related art.
Figure 2:
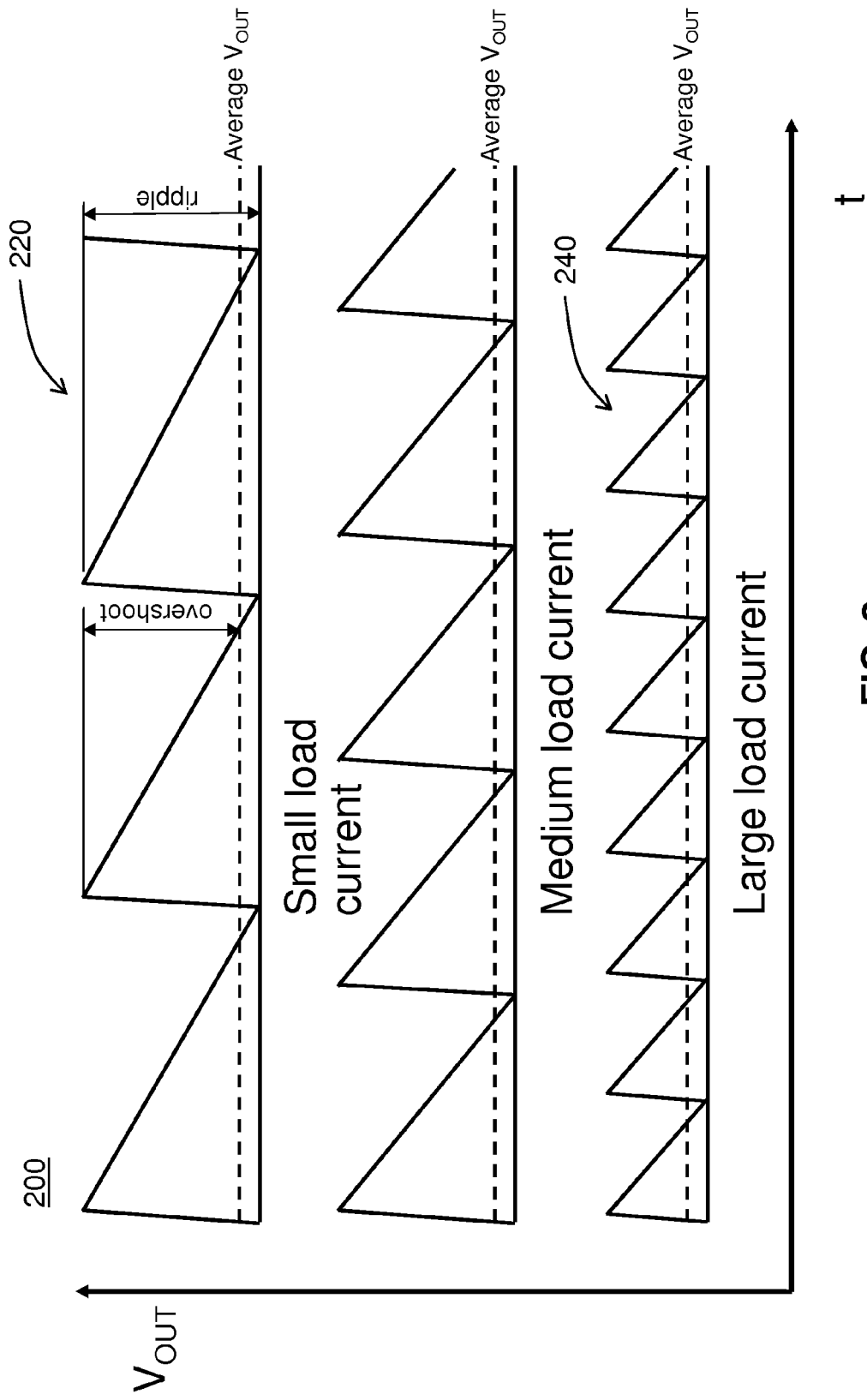
FIG. 2 is a graph illustrating voltage versus time for a small load current with a high voltage output, large voltage ripple and large overshoot, and for a large load current with a low voltage output, small voltage ripple and small overshoot in a conventional voltage charge pump in the related art.

The exemplary structures and methods of making the structures of the disclosure and their various features and advantageous details are explained more fully with reference to the non-limiting exemplary structures and methods of making the structures that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary methods, systems and products of the disclosure. The examples used herein are intended to merely facilitate an understanding of ways in which the exemplary structures and methods of making the structures of the disclosure may be practiced and to further enable those of skill in the art to practice the exemplary structures and methods of making the structures of the disclosure. Accordingly, the examples should not be construed as limiting the scope of the exemplary structures and methods of making the structures of the disclosure.

As stated above, there remains a need for a voltage charge pump scheme that provides improved voltage regulation across a load with small voltage ripple and overshoot to varying load currents without a large decoupling capacitance.

By design, the load current is a significant factor in determining the amount of charge that may be supplied by a voltage charge pump with each current pulse. The load current and the load capacitance, together, may significantly affect the voltage ripple. The interplay of these design factors for a voltage charge pump system may be problematic in that a voltage charge pump system designed to supply a large load current with some ripple, will have a relatively larger amount of ripple when the load current decreases. The problem is greater when the load capacitance is small. To address the problem, a voltage charge pump system may vary the amount of charge supplied to the load as a function of the load current.

Figure 3:
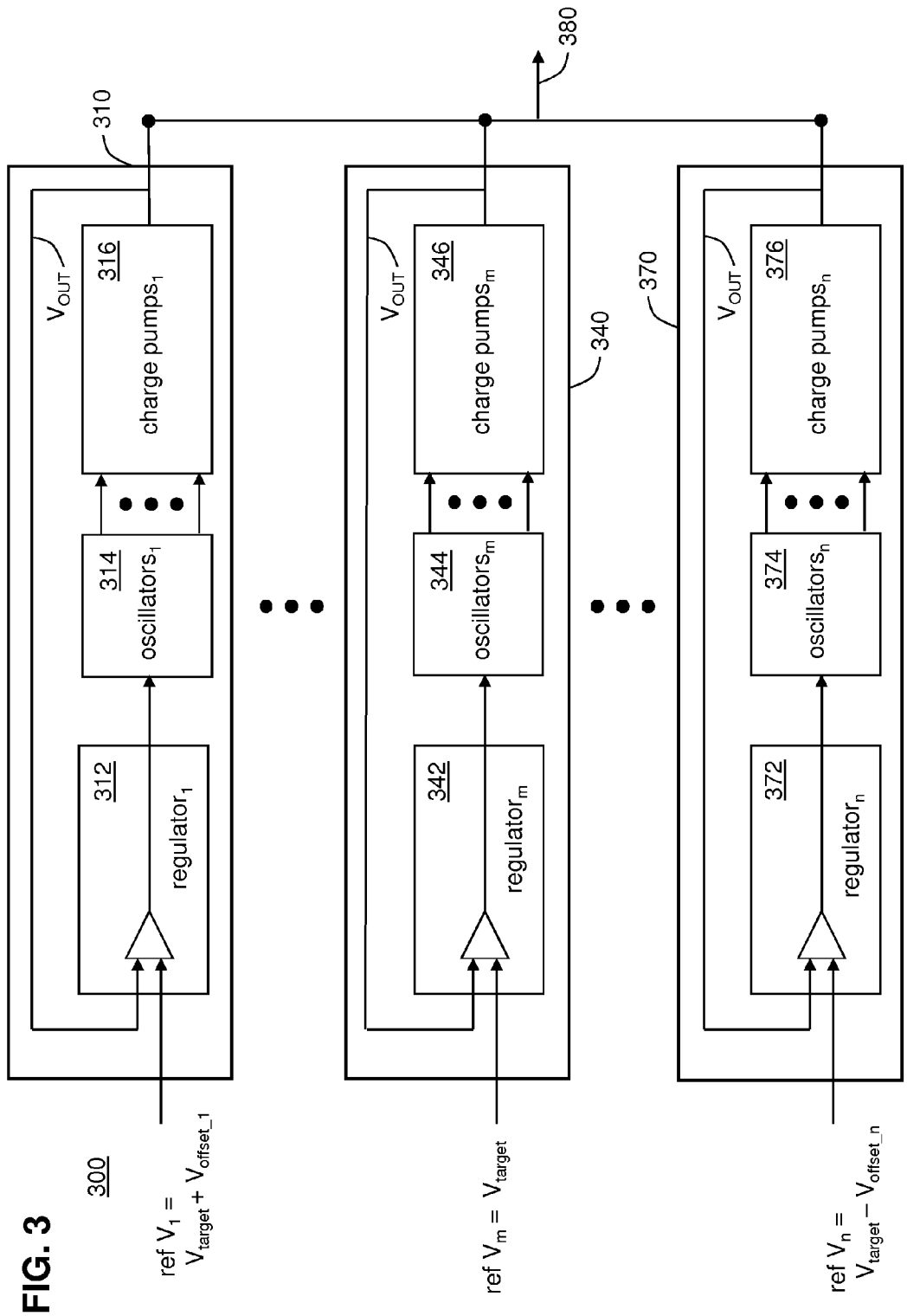
FIG. 3 is a schematic diagram of a load-sensing voltage charge pump system comprising a plurality of voltage charge pump segments, each associated with an input reference voltage, whose outputs are connected in parallel to a boosted output line for the system of a load-sensing voltage charge pump.

Referring to FIG. 3, the load-sensing voltage charge pump system 300 may include a plurality of reference voltage inputs, ref $V_1$ ... ref $V_n$, including a target voltage input, ref $V_m$. Each of the plurality of reference voltage inputs, other than the target voltage input, may be one of positively and negatively offset from the target voltage input. Each of the plurality of reference voltage inputs, ref $V_1$ ... ref $V_n$, may be input to one of a corresponding plurality of voltage charge pump segments 310, 340, 370.

Each of a plurality of voltage charge pump segments 310, 340, 370, may include a regulator 312, 342, 372, that receives one of the plurality of reference voltage inputs, ref $V_1$ ... ref $V_n$, and a plurality of voltage charge pumps 316, 346, 376 that output a current to a load at a sensed voltage, $V_{OUT}$, and feed back the sensed voltage to an input of the regulator 312, 342, 372. The regulators 312, 342, 372 may enable corresponding oscillators 314, 344, 374, and voltage charge pumps 316, 346, 376 of each of the voltage charge pump segments 310, 340, 370, when the sensed voltage, $V_{OUT}$, of each of the voltage charge pump segments 310, 340, 370 is less than or equal to the reference voltage input to the corresponding regulator and the target voltage input, ref $V_m = V_{target}$.

In this manner, when the sensed voltage of the load is equal to or slightly less than the target voltage input, ref $V_m = V_{target}$, but greater than the adjacent negatively offset reference voltage input, e.g., ref $V_n = V_{target} - V_{offset\_n}$, the voltage charge pump segment 340 may be turned on. However, when the sensed voltage of the load falls below that of the adjacent negatively offset reference voltage, e.g., ref $V_n = V_{target} - V_{offset\_n}$, due to a larger current load draining the load capacitance, both voltage charge pump segments 340 and 370 may be turned on, i.e., both voltage charge pump segments 340 and 370 will be turned on when the sensed voltage is equal to or less than ref $V_n = V_{target} - V_{offset\_n}$, which is necessarily less than $V_{target}$ of the plurality of reference voltage inputs.

In contrast, when the sensed voltage of the load rises above the target voltage, ref $V_m = V_{target}$, due to a smaller current load draining the load capacitance, voltage charge pump segment 340 and any voltage charge pump segments associated with voltage reference inputs that are negatively offset from the target voltage input may be turned off. The ordered plurality of reference voltage inputs, including both positively and negatively offset reference voltage inputs from the target voltage input, may allow a user to select a particular target voltage input within the range of the ordered plurality of reference voltage inputs for a particular application, e.g. one of a read operation and a write operation to a PCM cell.

Returning to FIG. 3, an output, $V_{OUT}$, of each of the plurality of voltage charge pump segments 310, 340, 370 may be connected in parallel to a boosted line 380 that supplies the load. The boosted line 380 may receive a current at the sensed voltage from each of the voltage charge pumps 316, 346, 376 that is enabled.

To reduce voltage output ripple, which primarily results from all of the switches of a single multi-stage voltage charge pump turning on and off at the same time, each of the voltage charge pump segments 310, 340, 370 may include a plurality of oscillators 314, 344, 374, each having a different frequency and each driving a corresponding voltage charge pump 316, 346, 376 of each the voltage charge pump segments 310, 340, 370. Each of the current outputs provided by each of the voltage charge pump segments may have a voltage output ripple of a different frequency. Consequently, the superposition of each of the currents from each of the voltage charge pump segments 310, 340, 370 of the load-sensing voltage charge pump system 300 may reduce the output voltage ripple.

The regulator 312, 342, 372 of each of the plurality of voltage charge pump segments 310, 340, 370 may comprise a comparator that compares the sensed voltage to the corresponding one of the plurality of reference voltage inputs. The comparator may be connected to a first oscillator and a second oscillator of oscillators 314, 344, 374, of each of the plurality of voltage charge pump segments, where the first oscillator and the second oscillator of the oscillators may be connected to a first voltage charge pump and a second voltage charge pump, respectively, of the voltage charge pumps 316, 346, 376 of each of the plurality of voltage charge pump segments that output a current to the boosted line 380. Each of the first oscillator and the second oscillator of the oscillators 314, 344, 374 may provide a different clock frequency to the first voltage charge pump and the second voltage charge pump of the voltage charge pumps 316, 346, 376.

Each of the first voltage charge pump and the second voltage charge pump of the voltage charge pumps 316, 346, 376 may be characterized by a supply voltage $V_{DD}$, a number N of pumping stages, and a pumping capacitance, C. Each of the first voltage charge pump and the second voltage charge pump of the voltage charge pumps 316, 346, 376 in the voltage charge pump segments 310, 340, 370 may have one of: a different pumping capacitance, C, and a different supply voltage, $V_{DD}$. Alternatively, each of the first voltage charge pump and the second voltage charge pump of the voltage charge pumps 316, 346, 376 in the voltage charge pump segments 310, 340, 370 may have a different pumping capacitance, C, and a different supply voltage, $V_{DD}$. These different capacitance and supply voltage values may alter the timing constants of the superimposed currents supplied to voltage charge pumps 316, 346, 376 so as to also reduce the output voltage ripple on the boosted line 380 of the load-sensing voltage charge pump system 300.

An aspect of the load-sensing voltage charge pump system 300 may include assigning one of the voltage charge pump segments, having a largest negative offset, as a bitline precharge voltage charge pump that provides, for example, current at a sensed $V_{OUT}$ of 0.4 V to a PCM cell in a PCM array.

Figure 4:
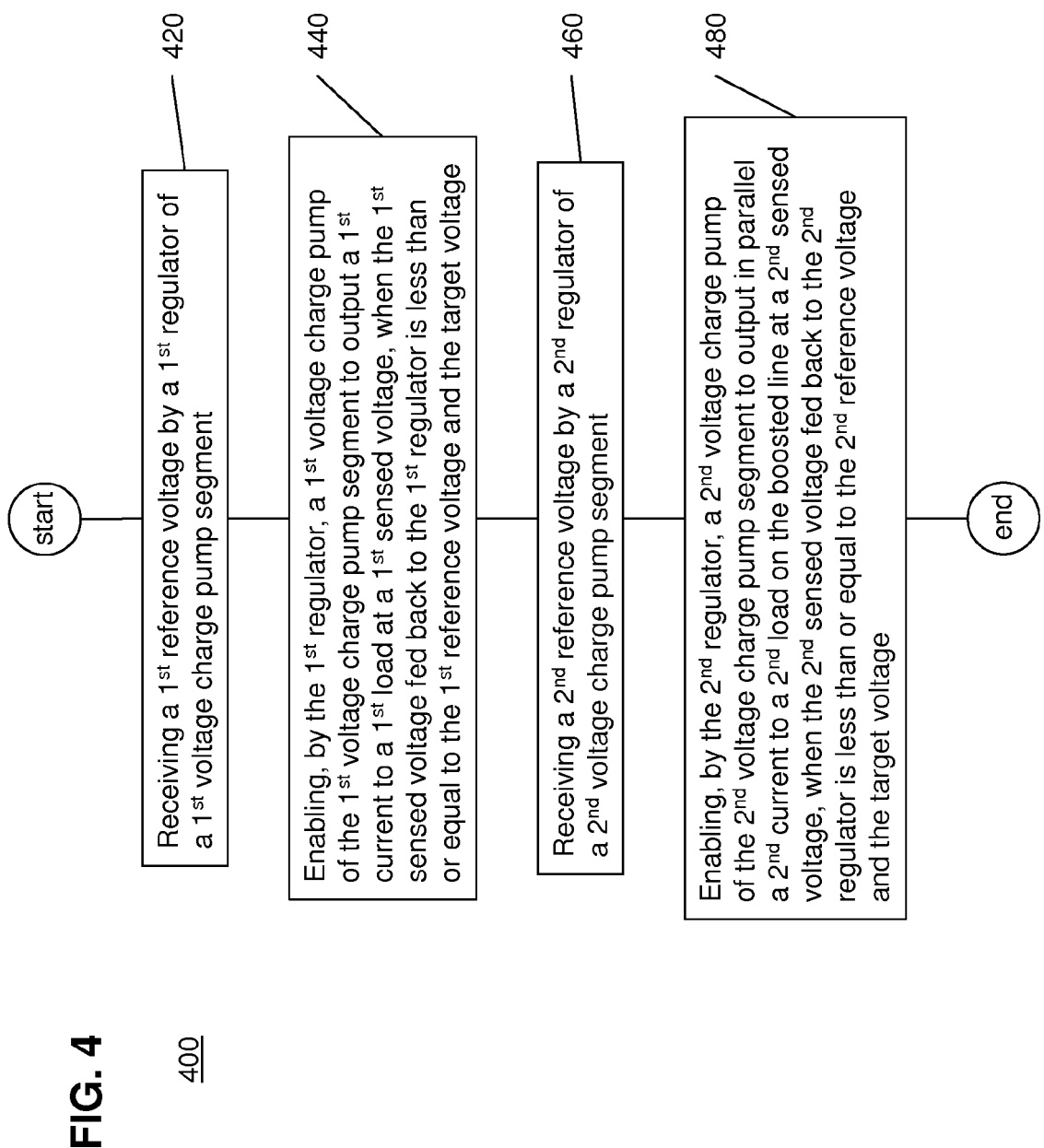
FIG. 4 is a flowchart illustrating a method of providing a current to a load in a load-sensing voltage charge pump system.

Referring to FIG. 4, a flow chart 400 illustrates a method of providing a current to a load in a load-sensing voltage charge pump system. The method may receive a first reference voltage of a plurality of reference voltages by a first regulator of a first voltage charge pump segment of said load-sensing voltage charge pump system, 420. The plurality of reference voltages may include a target voltage and each of the plurality of reference voltages, other than the target voltage, may be offset from the target voltage. The method may also enable, by the first regulator, a first voltage charge pump and a second voltage charge pump of the first voltage charge pump segment to output a first current to a first load on a boosted line at a first sensed voltage, when the first sensed voltage fed back to the first regulator is less than or equal to the first reference voltage and the target voltage, 440. The method may further receive a second reference voltage of the plurality of reference voltages by a second regulator of a second voltage charge pump segment of the load-sensing voltage charge pump system, 460. Finally, the method further enable, by the second regulator, a third voltage charge pump and a fourth voltage charge pump of the second voltage charge pump segment to output, in parallel to the first current, a second current to a second load on the boosted line at a second sensed voltage, when the second sensed voltage fed back to the second regulator is less than or equal to the second voltage reference and the target voltage, 480.

The method may further include comparing by the first regulator, which comprises a first comparator, the first sensed voltage to the first voltage reference, and enabling a first oscillator that is connected to the first voltage charge pump and a second oscillator that is connected to the second voltage charge pump. The method may also include comparing by the second regulator, which comprises a second comparator, the second sensed voltage to the second voltage reference, and enabling a third oscillator that is connected to the third voltage charge pump and a fourth oscillator that is connected to the fourth voltage charge pump.

The method may further include providing by the first oscillator and the second oscillator, different clock frequencies to the first voltage charge pump and the second voltage charge pump, respectively. Similarly, the third oscillator and the fourth oscillator may provide different clock frequencies to the third voltage charge pump and the fourth voltage charge pump, respectively.

Each of the first voltage charge pump and the second voltage charge pump may have one of: a different pumping capacitance, C, and a different supply voltage, $V_{DD}$. Similarly, each of third voltage charge pump and the fourth voltage charge pump may have one of: a different pumping capacitance, C, and a different supply voltage, $V_{DD}$.

Alternatively, each of the first voltage charge pump and the second voltage charge pump may have a different pumping capacitance, C, and a different supply voltage, $V_{DD}$. Similarly, each of the third voltage charge pump and the fourth voltage charge pump may have a different pumping capacitance, C, and a different supply voltage, $V_{DD}$.

Alternatively, each of the first oscillator, the second oscillator, the third oscillator, and the fourth oscillator may have a different frequency.

In the above case, each of the first voltage charge pump and the second voltage charge pump may have one of: a different pumping capacitance, C, and a different supply voltage, $V_{DD}$. Similarly, in the above case, each of the third voltage charge pump and the fourth voltage charge pump may have one of: a different pumping capacitance, C, and a different supply voltage, $V_{DD}$.

Alternatively, in the above case, each of the first voltage charge pump and the second voltage charge pump may have a different pumping capacitance, C, and a different supply voltage, $V_{DD}$. Similarly, each of the third voltage charge pump and the fourth voltage charge pump may have a different pumping capacitance, C, and a different supply voltage, $V_{DD}$.

The voltage ripple of the load-sensing voltage charge pump system, described above, may be significantly reduced across a range of current loads, when compared to the voltage ripple of a conventional multi-stage voltage charge pump across the same range of current loads; while the sensed average $V_{OUT}$ of the load-sensing voltage charge pump system may show little reduction across the range of current loads, when compared to the conventional multi-stage voltage charge pump. Furthermore, an overshoot to a slow load, switch off for the conventional multi-stage voltage charge pump may be significantly higher, when compared to the overshoot of the same slow load, switch off for the load-sensing voltage charge pump system. Similarly, an overshoot to a fast load, switch off for the conventional multi-stage voltage charge pump may also be significantly higher, when compared to the overshoot of the same fast load, switch off for the load-sensing voltage charge pump system.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A load-sensing voltage charge pump system with reduced output voltage ripple, comprising:

a plurality of reference voltage inputs comprising a target voltage and a sum of said target voltage and a plurality of voltage offsets, each of said plurality of voltage offsets being offset from said target voltage input by a different amount;

a plurality of voltage charge pump segments equal in number to said plurality of reference voltage inputs, each of said plurality of voltage charge pump segments including:

a regulator receiving one of said plurality of reference voltage inputs, a plurality of oscillators enabled by said regulator when a sensed output voltage of a corresponding one of said plurality of voltage charge pump segments is less than or equal to a corresponding one of said plurality of reference voltage inputs, each of said plurality of oscillators having one of a plurality of different frequencies, and a plurality of voltage charge pumps, each of said plurality of voltage charge pumps being driven by a corresponding one of said plurality of oscillators and outputting a current of said one of a plurality of different frequencies, each said current of each of said plurality of voltage charge pumps producing a single frequency component of a sensed output voltage across an output load, and feeding back each said single frequency component of said sensed output voltage to said regulator; and a boosted line connected in parallel to said sensed output voltage of each of said plurality of voltage charge pump segments, said boosted line being connected to said output load, said boosted line receiving each said current of each one of a plurality of different frequencies corresponding to each of a plurality of oscillators in each one of said plurality of voltage charge pump segments that is enabled by its corresponding regulator to produce said target voltage with reduced output voltage ripple.

2. The system of claim 1, said regulator of each of said plurality of voltage charge pump segments comprising a comparator comparing said sensed output voltage to said corresponding one of said plurality of reference voltage inputs.

3. The system of claim 1, each one of said plurality of voltage charge pumps of each corresponding one of said plurality of voltage charge pump segments having one of: a different pumping capacitance, C, and a different supply voltage, $V_{DD}$.

4. The system of claim 1, each one of said plurality of voltage charge pumps of each corresponding one of said plurality of voltage charge pump segments having a different pumping capacitance, C, and a different supply voltage, $V_{DD}$.

5. The system of claim 1, one of said plurality of reference voltage inputs most negatively offset from said target voltage input, being input to one of said plurality of voltage charge pump segments that provides a pre-charge to said boosted line.

6. A system, comprising:
a plurality of reference voltage inputs comprising a target voltage and a sum of said target voltage and a plurality of voltage offsets, each of said plurality of voltage offsets being offset from said target voltage input by a different amount;
a plurality of voltage charge pump segments equal in number to said plurality of reference voltage inputs, each of said plurality of voltage charge pump segments including:
a regulator receiving one of said plurality of reference voltage inputs, said regulator of each of said plurality of voltage charge pump segments comprising a comparator comparing a sensed output voltage to said corresponding one of said plurality of reference voltage inputs,
a plurality of oscillators enabled by said regulator when a sensed output voltage of a corresponding one of said plurality of voltage charge pump segments is less than or equal to a corresponding one of said plurality of reference voltage inputs, each of said plurality of oscillators having one of a plurality of different frequencies, and
a plurality of voltage charge pumps, each of said plurality of voltage charge pumps being driven by a corresponding one of said plurality of oscillators and outputting a current of said one of a plurality of different frequencies, each said current of each of said plurality of voltage charge pumps producing a single frequency component of a sensed output voltage across an output load, and feeding back each said single frequency component of said sensed output voltage to said regulator; and a boosted line connected in parallel to said sensed output voltage of each of said plurality of voltage charge pump segments, said boosted line being connected to said output load, said boosted line receiving each said current of each one of a plurality of different frequencies corresponding to each of a plurality of oscillators in each one of said plurality of voltage charge pump segments that is enabled by its corresponding regulator to produce said target voltage with reduced output voltage ripple.

7. The system of claim 6, each one of said plurality of voltage charge pumps of each corresponding one of said plurality of voltage charge pump segments having one of: a different pumping capacitance, C, and a different supply voltage, $V_{DD}$.

8. The system of claim 6, each one of said plurality of voltage charge pumps of each corresponding one of said plurality of voltage charge pump segments having a different pumping capacitance, C, and a different supply voltage, $V_{DD}$.

9. The system of claim 6, one of said plurality of reference voltage inputs most negatively offset from said target voltage input, being input to one of said plurality of voltage charge pump segments to provide a pre-charge to said boosted line.

10. A method comprising:
receiving, by a corresponding plurality of regulators within a corresponding plurality of voltage charge pump segments, a plurality of reference voltages comprising a target voltage and a sum of said target voltage and a plurality of voltage offsets and connecting to said plurality of regulators, each of said plurality of voltage offsets being offset from said target voltage;
enabling by said corresponding plurality of regulators, a corresponding plurality of oscillators when a sensed output voltage of a corresponding one of said plurality of voltage charge pump segments is less than or equal to a corresponding one of said plurality of reference voltages, each of said plurality of oscillators having one of a plurality of different frequencies;
driving by each one of said corresponding plurality of oscillators, one of a plurality of corresponding voltage charge pumps that outputs a current of said one of a plurality of different frequencies, each said current of each of said plurality of voltage charge pumps producing a single frequency component of a sensed output voltage across an output load, and feeding back each said single frequency component of said sensed output voltage to said regulator; and
producing said target voltage across said output load with reduced output voltage ripple, a boosted line being connected to said output load and connected in parallel to said sensed output voltage of each of said plurality of voltage charge pump segments, said boosted line receiving each said current of each one of a plurality of different frequencies corresponding to each of a plurality of oscillators in each one of said plurality of voltage charge pump segments that is enabled.

11. The method of claim 10, each one of said plurality of voltage charge pumps of each corresponding one of said plurality of voltage charge pump segments.

12. The method of claim 10, each one of said plurality of voltage charge pumps of each corresponding one of said plurality of voltage charge pump segments.

* * * * *